United States Patent
Bastiani

(10) Patent No.: US 10,342,081 B2
(45) Date of Patent: Jul. 2, 2019

(54) LED DRIVER FOR PROVIDING POWER TO PARALLEL LEDS

(71) Applicant: Astronics DME LLC, Ft. Lauderdale, FL (US)

(72) Inventor: Sergio Bastiani, Fort Lauderdale, FL (US)

(73) Assignee: Astronics DME LLC, Ft. Lauderdale, FL (US)

( * ) Notice: Subject to any disclaimer, the term of this patent is extended or adjusted under 35 U.S.C. 154(b) by 0 days.

(21) Appl. No.: 15/873,888

(22) Filed: Jan. 17, 2018

(65) Prior Publication Data

US 2018/0213622 A1 Jul. 26, 2018

Related U.S. Application Data

(60) Provisional application No. 62/446,955, filed on Jan. 17, 2017.

(51) Int. Cl.
H05B 37/02 (2006.01)
H05B 39/04 (2006.01)
H05B 33/08 (2006.01)

(52) U.S. Cl.
CPC ..... H05B 33/0827 (2013.01); H05B 33/0815 (2013.01); H05B 33/0818 (2013.01); *Y02B 20/347* (2013.01)

(58) Field of Classification Search
CPC ............ H05B 33/0815; H05B 33/0818; H05B 41/2828; H05B 41/3921; H05B 41/3927; H05B 37/029; H05B 33/0803; H05B 37/0254; H05B 37/02; H05B 41/28; H05B 41/295; H05B 41/2827; H05B 41/3925; Y02B 20/202
See application file for complete search history.

(56) References Cited

U.S. PATENT DOCUMENTS 9,420,644 B1 * 8/2016 Shum ...................... F21V 29/74
2016/0338157 A1 * 11/2016 Kurishita ........... H05B 33/0815
2017/0013686 A1 * 1/2017 Ido ..................... H05B 33/0842

* cited by examiner

*Primary Examiner* — Minh D A
(74) *Attorney, Agent, or Firm* — Hodgson Russ LLP

(57) ABSTRACT

An LED driver is provided. The LED driver has a constant current power source. In some embodiments, the constant current power source is an electrical input configured for connection to a source of power at a constant current. In some embodiments, the source of power is a constant current regulator. The LED driver also includes a switch electrically connected to the constant current power source. The switch has at least two outputs wherein the switch is configured to selectively connect the constant current power source to each of the at least two outputs. The switch is configured to connect each of the at least two outputs for a pre-determined period of time.

6 Claims, 2 Drawing Sheets

LED DRIVER FOR PROVIDING POWER TO PARALLEL LEDS

CROSS-REFERENCE TO RELATED APPLICATIONS

The present application claims priority to U.S. Provisional Application No. 62/446,955, filed on Jan. 17, 2017, now pending, the disclosure of which is incorporated herein by this reference.

FIELD OF THE DISCLOSURE

The present disclosure relates to LED lighting, and in particular, to constant current power supplies.

BACKGROUND OF THE DISCLOSURE

In the United States, airfield lighting is the subject of regulation by the Federal Aviation Administration ("FAA"). For example, runway and taxiway signs must conform to the "Specification for Runway and Taxiway Signs," published by the FAA in Advisory Circular 150/5345-44K. Power for such lighting is outlined in the FAA Specification, and is available in the form of constant RMS current of 2.8 A to 6.6 A via constant current regulators ("CCR"). Conventional LED lighting drivers take power from a CCR loop and convert it to feed LEDs at a constant current. In order for this topology to work, LEDs electrically connected to and driven by a lighting driver must connected in series (the LEDs are series connected with each other to form a string). Where multiple parallel strings of series LEDs are used, previous systems powered each string of LEDs using a separate lighting driver.

BRIEF SUMMARY OF THE DISCLOSURE

An LED driver is provided. The LED driver has a constant current power source. In some embodiments, the constant current power source is an electrical input configured for connection to a source of power at a constant current. In some embodiments, the source of power is a constant current regulator. The LED driver also includes a switch electrically connected to the constant current power source. In some embodiments, the switch may be or may include, for example, a MOSFET. The switch has at least two outputs wherein the switch is configured to selectively connect the constant current power source to each of the at least two outputs. In an exemplary embodiment, an LED driver has four outputs. The switch is configured to connect each of the at least two outputs for a pre-determined period of time. In some embodiments, the LED driver includes a processor operably connected to the switch. The processor may be programmed to cause the switch to sequentially connect to each of the at least two outputs for a pre-determined period of time.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
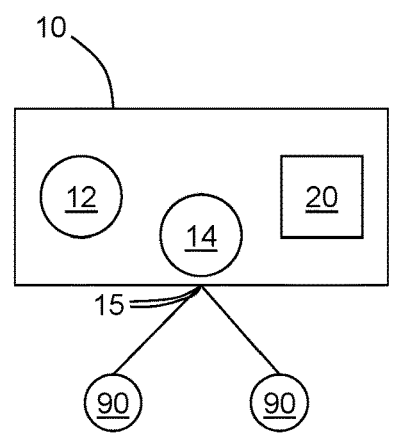
FIG. 1 is a schematic of an LED driver according to an embodiment of the present disclosure.

The present disclosure provides the ability of using a single LED driver with parallel LEDs (or parallel strings of LEDs). In this way, large LED strings requiring high voltages can be split into a number of smaller strings allowing for the use of lower (i.e., safer) voltages.

The present disclosure can be embodied as an LED driver 10 for providing power to one or more parallel LEDs 90 or strings of LEDs. The LED driver 10 includes a constant current power source 12. Such a constant current power source 12 may be a circuit included within the LED driver 10. For example, the constant current power source 12 may be a circuit having a current regulator within the LED driver 10. In another embodiment, the constant current power source is an input (e.g., a set of input pins) of the LED Driver 10, wherein the input is configured to be connected to a source of power at a constant current. For example, the LED driver may have a constant current power source which is an input terminal configured to be electrically connected to a CCR loop of an airfield.

The LED driver 10 has a switch 14 connected to the constant current power source 12. The switch 14 has at least two outputs 15, and the switch 14 is configured to selectively connect the constant current power source 12 to each of the at least two outputs 15. For example, the switch 14 may connect source 12 to a first of the outputs 15, and then it may be switched to connect source 12 to a second of the outputs 12. By using a fast switch 14, the power from the constant current power source 12 can be time-sliced across each of the outputs 15 to provide an effective constant current which is the average of the instantaneous current. As such, the switch 14 must be fast enough to provide an instantaneous current to each output 15 that is effectively a constant current for the application at hand. For example, where a string of LED drivers is connected to each output of the LED driver, the current is switched to each string of LEDs at a rate which is imperceptible to a human observer. In the case of LEDs, an exemplary time period, which has been found to be suitable, is 1/120 second, though the time may be longer or shorter. A more particular example, is discussed below. An example of a suitable switch is a MOSFET. Other suitable switches will be apparent to one having skill in the art in light of the present disclosure.

To provide an average current of value X Amps to each of N outputs, the LED driver is configured to provide a constant driver current of X*N Amps. This driver current is sliced over a time period T such that each output is connected to the driver current for a time T÷N. In this way, a power of X*N is provided to each output (e.g., a string of LEDs connected to each output) for a period of T÷N resulting in an average power of X during time T.

The LED driver 10 may include a processor 20 which is operably connected to the switch 14. The processor 20 is configured to cause the switch 14 to sequentially connect each of the at least two outputs 15 to the constant current power source 12. In this way, each output 15 can be connected to the power source 12 for a pre-determined period of time (i.e., at a pre-determined rate).

Figure 2:
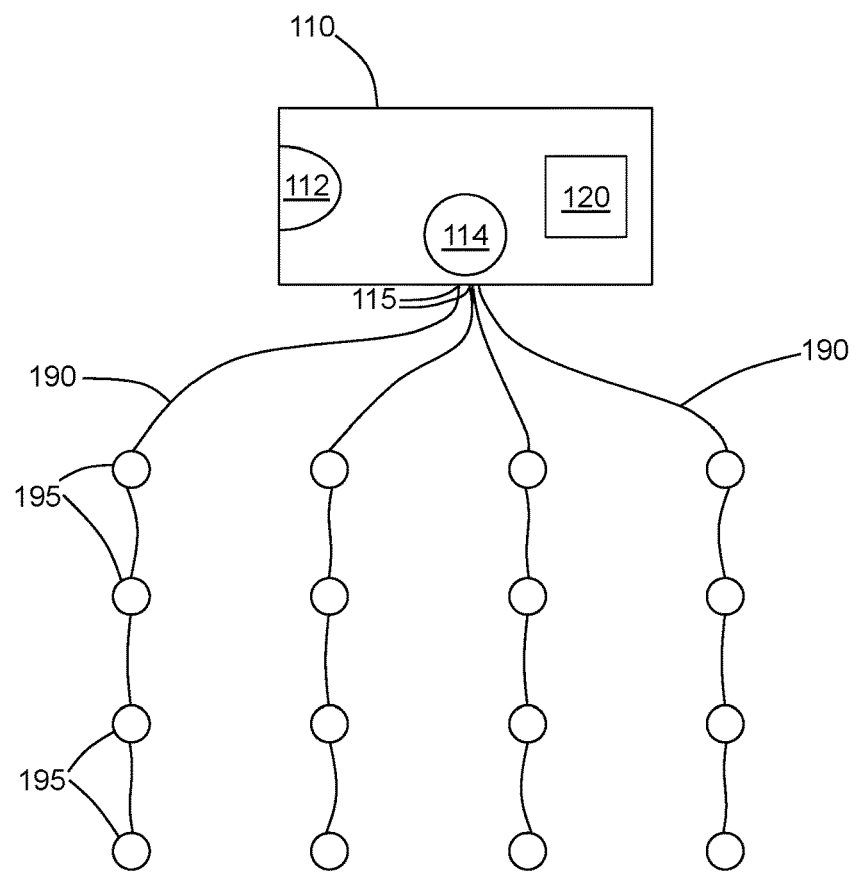
FIG. 2 is a schematic of an LED driver according to another embodiment of the present disclosure, wherein the LED driver is connected to four strings of LEDs.
Figure 3:
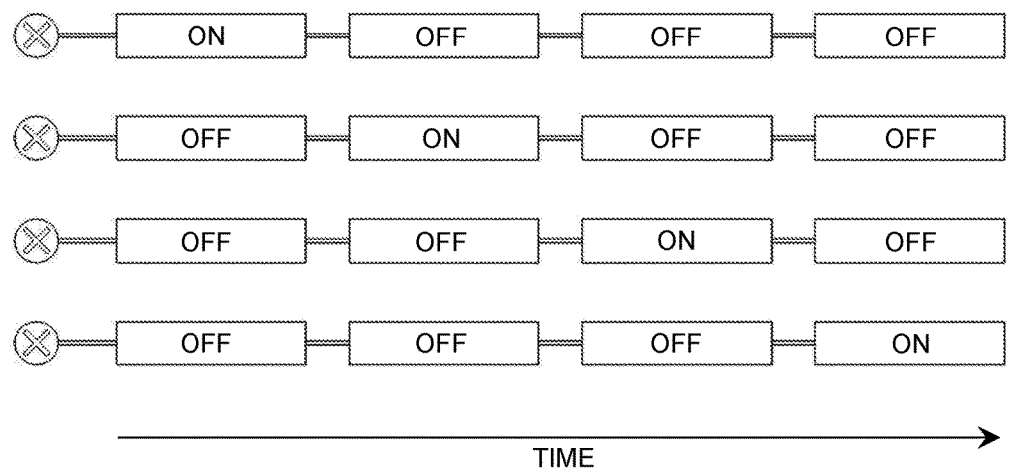
FIG. 3 is a diagram showing the sequence by which the switch of FIG. 2 provides power to each string of LEDs.

In a particular example depicted in FIG. 2, an LED driver 110 is connected to four strings 190 of LEDs 195. Each string 190 comprises a plurality of LEDs 195 connected in series. Each string 190 of LEDs is configured to be driven by a 100 mA current. As such, the LED driver 110 is configured to provide a constant current of 400 mA to a selected output 115 of a four-output switch 114. A processor 120 of the exemplary LED driver is programmed to operate the switch at a rate of 1000 Hz such that each output of the switch is cycled with power for 1 ms and then disconnected for 3 ms. Each output 115 of the switch 114 is provided with power in sequence such that only one of the four outputs has power at any time (see, e.g., FIG. 3). The connection between the power source 112 and the switch outputs 115 may be made in a make-before-break fashion. In this way, the instantaneous current through each string alternates between 0 mA (for 3 ms) and 400 mA (for 1 ms), and the average current through each string of LEDs is 100 mA (an effective constant current of 100 mA).

Although the present disclosure has been described with respect to one or more particular embodiments, it will be understood that other embodiments of the present disclosure may be made without departing from the spirit and scope of the present disclosure.

I claim:

1. An LED driver, comprising:

a constant current power source;

a switch electrically connected to the constant current power source, the switch having at least two outputs wherein the switch is configured to selectively connect the constant current power source to each of the at least two outputs; and wherein the switch is configured to connect each of the at least two outputs for a pre-determined period of time, wherein the pre-determined period of time is selected such that one or more LEDs connected to an output are connected and disconnected at a rate imperceptible to an observer.

2. The LED driver of claim 1, further comprising a processor operably connected to the switch, wherein the processor is programmed to cause the switch to sequentially connect to each of the at least two outputs for a pre-determined period of time.

3. The LED driver of claim 1, wherein the constant current power source is an electrical input configured for connection to a source of power at a constant current.

4. The LED driver of claim 3, wherein the source of power is a constant current regulator.

5. The LED driver of claim 1, wherein the switch comprises a MOSFET.

6. The LED driver of claim 1, wherein the switch includes four outputs.

* * * * *